United States Patent [19]

Tirelli

[11] 4,095,159

[45] June 13, 1978

[54] ELECTRONIC APPARATUS FOR AUTOMATIC CLOSED LOOP POSITIONING OF MOBILE MEMBERS ASSOCIATED WITH AN ELECTROMAGNETIC TRANSDUCER WITH TWO PAIRS OF WINDINGS

[75] Inventor: Paolo Tirelli, Taino (Varese), Italy

[73] Assignee: Exo Elettronica Industriale S.r.l., Milan, Italy

[21] Appl. No.: 639,126

[22] Filed: Dec. 9, 1975

[51] Int. Cl.² .............................................. G05B 19/30
[52] U.S. Cl. .................................. 318/605; 318/654; 318/661
[58] Field of Search ............... 318/605, 654, 657, 658, 318/659, 660, 661

[56] References Cited

U.S. PATENT DOCUMENTS

| 3,624,642 | 11/1971 | Tripp | 340/347 AD |
| 3,671,728 | 6/1972 | Day et al. | 235/189 |
| 3,686,487 | 8/1972 | Tripp | 318/605 |
| 3,855,514 | 12/1974 | Zwitter et al. | 318/660 |
| 3,860,920 | 1/1975 | Tripp | 340/347 SY |
| 3,870,938 | 3/1975 | Tooze et al. | 318/605 |

Primary Examiner—Robert K. Schaefer
Assistant Examiner—John J. Feldhaus
Attorney, Agent, or Firm—Diller, Brown, Ramik & Wight

[57] ABSTRACT

This invention relates to an electronic apparatus for automatic positioning and distance measurement of mobile members. The apparatus according to the invention comprises a rotary electromagnetic transducer with two pairs of windings, in which the primary circuits receive electrical voltages representative of the controlled angular distance values and the secondary circuits deliver accordingly an electrical response voltage, whose shape and amplitude depend on the difference between said controlled distance and the mechanical angle between rotar and stator portions containing said secondary and, respectively, primary circuits. The electrical voltages representative of the controlled angular distance values are generated by electronic circuits comprising a first binary counter which translates the controlled distance into binary code, a second binary counter which generates a binary ramp, two adders, a combining network, four sequential networks and two analogue amplification and sign circuits. The electrical response voltage is in turn filtered and demodulated to represent a distance error signal which, in case of positioning, drives the positioning linkage block and, in case of distance measurement, compels the first binary counter to operate in such a manner that the distance represented therein tends towards the value of the relative angle between the rotar and stator portions of the electromagnetic transducer.

5 Claims, 6 Drawing Figures

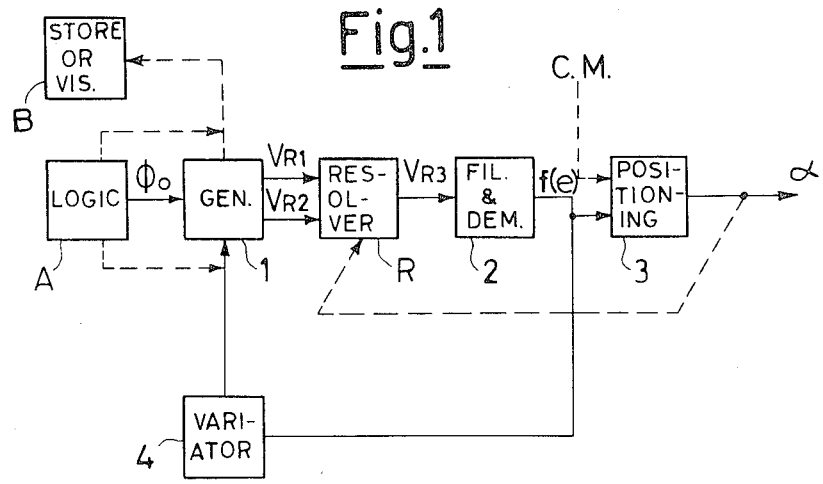
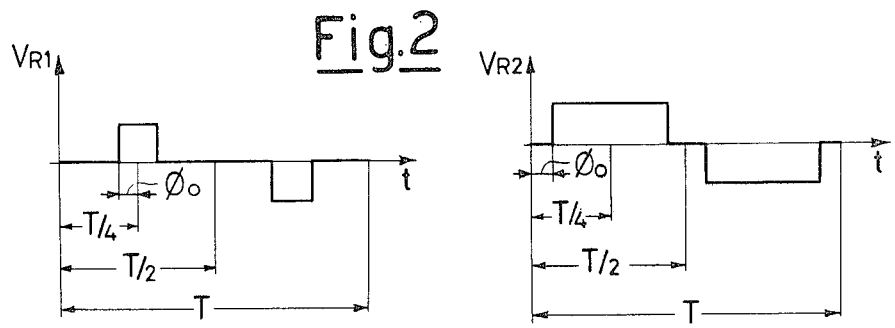
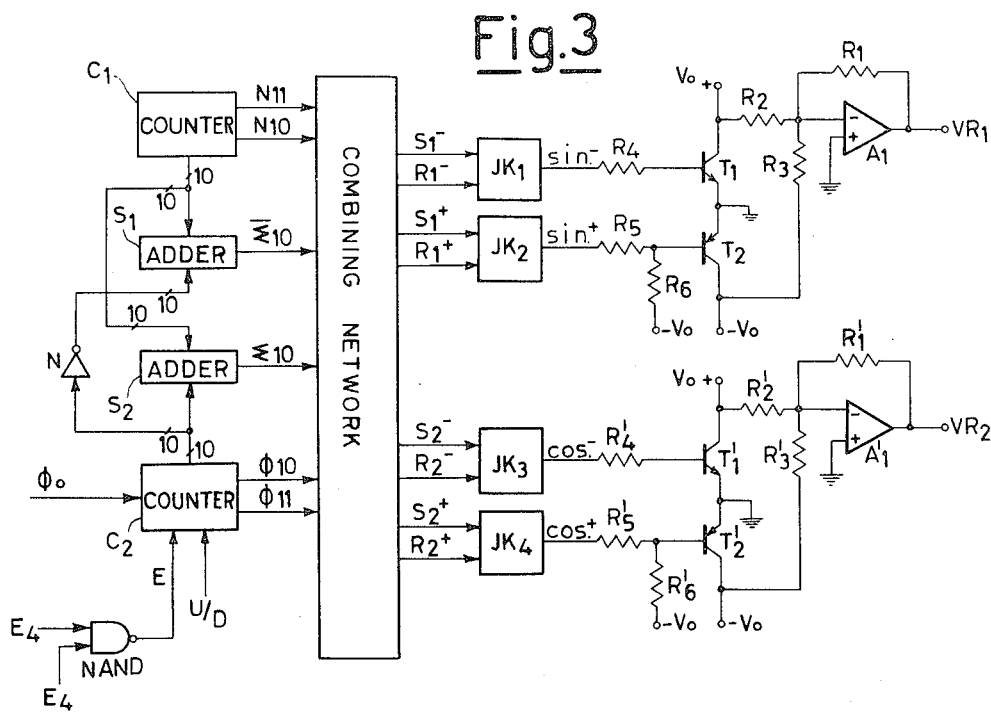

ELECTRONIC APPARATUS FOR AUTOMATIC CLOSED LOOP POSITIONING OF MOBILE MEMBERS ASSOCIATED WITH AN ELECTROMAGNETIC TRANSDUCER WITH TWO PAIRS OF WINDINGS

This invention relates to an electronic apparatus for feeding an electromagnetic position transducer with two pairs of windings measuring the response of the transducer, and generating an electrical function in relation to the difference between the set distance and real distance which enables the real distance to be read in absolute form within the extent of the system of movement.

The aforementioned requirements occur in a plurality of applications in which it is necessary to position a mobile element, whether this element moves on a guide or carriage, in which case the movement and hence the distance are linear, or whether it moves with rotary motion about an axis, in which case the distance is an angular distance.

The expression "to position the mobile element" means the facility to bring the mobile element to a desired distance within the field of movement, starting from any position or distance at which it was previously located.

The solution to this problem requires the availability of the following:

An electrical quantity (for example a voltage), the amplitude of which represents the desired distance. This is the reference signal for the servo-system which carries out the positioning;

An angular or linear position transducer, i.e., an element able to transduce an angular or linear distance into an electrical signal. An angular position transducer suitably coupled to the mobile element may also be used for the linear distances.

A suitable electronic apparatus able to measure the error between the required distance and the real distance measured by the transducer, and to drive the positioning linkage which moves the mobile element in accordance with this error, so as to cancel the position error.

The positioning accuracy depends primarily on the type of position transducer used, because of which its choice is important if a good positioning system is to be obtained.

The electromagnet transducer with two pairs of windings as used in the present invention, and known more familiarly as a resolver, represents an excellent compromise between the contrasting characteristics required.

The resolver consists of two pairs of electrical windings one pair of which is wound on the resolver housing itself, i.e. on the stator, and the other on the rotor.

Each pair is wound in such a manner that the two windings which make up the pair are in mutual quadrature.

The operation of the resolver is based on the transformer principle. Thus, if the two rotor windings are fed with two alternating voltages in quadrature $$V_1 = K \sin wt$$
$$V_2 = K \cos wt$$

where $w$ = pulsation (rad/sec)

$t$ = time (sec)
$K$ = constant and at fixed frequency (e.g., 400 Hz), a voltage is induced in each stator winding which is proportional to the flux linkage of the winding itself, and consequently the two voltages available across the two stator windings are of the type:

$$E_1 = V_1 \cos \phi_o + V_2 \sin \phi_o = K \sin (wt + \phi_o)$$

$$E_2 = V_2 \cos \phi_o - V_1 \sin \phi_o = K \cos (wt + 100_o)$$

where $\phi_o$ is the mechanical angle through which the rotor (and hence the resolver shaft) is rotated in the anti-clockwise direction from the "neutral position" in which the stator windings $ST_1$ and $ST_2$ face, and are consistent with, the respective rotor windings $RT_1$ and $RT_2$.

It should be noted that the signs of the expressions for $E_1$ and $E_2$ depend upon the manner in which the electrical connections are made, both for the feed and for the response.

It can be seen from the expressions for $E_1$ and $E_2$ that the phase of these two voltages is given by the mechanical angle $\phi_o$ as defined heretofore.

Consequently by demodulating these voltages, a voltage can be obtained which is proportional to the mechanical angle $\phi_o$.

In this case, the resolver is used as a transmitter because it transduces a mechanical angle into one phase of an alternating voltage, and this voltage can then be used to transduce the measurement of an angle.

If, on the other hand, the two stator windings of a resolver in which the rotor is displaced in phase by an angle $\alpha$ from the neutral position is fed with two voltages equal to $E_1$ and $E_2$, two voltages will be available at the rotor type $$U_1 = E_1 \cos \alpha - E_2 \sin \alpha$$

$$U_2 = E_1 \sin \alpha + E_2 \cos \alpha$$

and the voltages $U_1$ and $U_2$ may be expressed, by expansion, by the functions:

$$U_1 = K \sin [wt + (\phi_o - \alpha)]$$

$$U_2 = K \cos [wt + (\phi_o - \alpha)]$$

where $\alpha$ is the mechanical angle through which the shaft and hence the resolver rotor is rotated in the anti-clockwise direction, and $\phi_o$ represents an imaginary angle contained in the form of the voltages $E_1$ and $E_2$.

As can be seen from the expressions for $U_1$ and $U_2$, in these two voltages the phase depends on the difference between the angle $\phi_o$ set by the voltages $E_1$ and $E_2$, and the mechanical angle $\alpha$.

Consequently by demodulating one of the two voltages, a voltage is obtained proportional to the phase ($\phi_o - \alpha$).

From the aforegoing, if the resolver is keyed on to a mobile element, its output voltatge is proportional to the error between a set distance $\phi_o$ and the true distance $\alpha$ of the mobile element.

This represents an important step towards the solution of the positioning problem whenever a pair of voltages of type similar to $E_1$ and $E_2$ are generated to feed the resolver.

In fact it is the resolver itself which, by the phase of one of the two output voltages, determines the distance error with which the appropriate positioning linkage may be instantaneously fed.

From the aforegoing description, it can be seen that it is possible to generate the tensions $E_1$ and $E_2$ using a resolver as a transmitter.

In this case the desired distance is set by acting manually on the resolver shaft, but this is incompatible with automatic positioning systems.

The problem is therefore to generate two voltages of type $E_1$ and $E_2$ which transmit the desired distance by purely electronic automatic means.

The present invention is characterised by the presence of electronic circuits able to generate two voltages of type similar to $E_1$ and $E_2$ digitally without any part in movement, and completely automatically.

The apparatus is also able to demodulate the response of the resolver to determine the distance error. This demodulated response is used to drive the positioning linkage and is also used to measure the true distance reached by the mobile member.

From the aforegoing description, the present invention is seen to have the following advantages:

it can position the mobile element at any distance within the field of measurement, either by manual control or by logic control acting on the distance logic;

it can execute positioning operations in any sequence with almost absolute precision and repeatability. To excecute the sequence, the distance logic must evidently contain a suitable sequencer; it can excecute the positioning sequence under the control of any digital process computer, without the need for complicated interfaces. In this respect, the generation of the resolver control signals is digital and enables the computer to have easy access to the apparatus;

it can measure the distance reached with manual control in binary code and then visualize it and/or store it.

The operation of the present invention will be more evident by reference to the following figures, in which:

FIG. 1 is a functional block representation of the apparatus according to the present invention, complete with functional inlet and outlet blocks;

FIG. 2 shows the shape of the two voltages generated by the apparatus and used for controlling the rotary electromagnet transducer;

FIG. 3 is a simplified electrical circuit diagram of that part of the apparatus which generates the two voltages used for controlling the rotary electromagnetic transducer;

Figure 4:
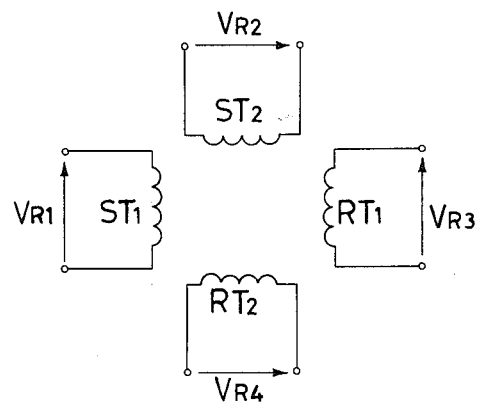
FIG. 4 is a diagrammatic representation of the electrical windings of the rotary electromagnetic transducer.

With reference to FIG. 1, the block "A" represents a suitable digital logic which expresses the required distance $\phi_o$ in the binary system with twelve bits, and transmits it to the block 1.

The required distance $\phi_o$ may reach block A for example from a store or from a preselector.

The block 1 generates two voltages $VR_1$ and $VR_2$, used for feeding the resolver.

The two voltages $VR_1$ and $VR_2$ are generated digitally on the basis of the reference (or required) distance $\phi_o$ transmitted to the block 1 by the logic A.

The shape of the two voltages $VR_1$ and $VR_2$ is symmetrical and is illustrated in the diagrams of FIG. 2, which show that the voltages $VR_1$ and $VR_2$ are generated with a fixed amplitude but with different mutually correlated shapes and phases.

The two voltages $VR_1$ and $VR_2$ are equivalent to the voltages $E_1$ and $E_2$, and if the Fourier series for these voltages is expanded, they may be expressed as:

$VR_1 = K \sin wt \sin \phi_o +$ higher harmonics $VR_2 = K \sin wt \cos \phi_o +$ higher harmonics where $w = 2\pi/T$.

Thus the first harmonic of the voltages $VR_1$ and $VR_2$ is seen to have an expression analogous to that for the voltages $E_1$ and $E_2$, and they may therefore be used to transmit the required distance $\phi_o$ to the resolver.

The block R represents the resolver, the response of which, taken across a single rotor winding, is given from the aforegoing description by:

$VR_3 = VR_1 \cos \alpha - VR_2 \sin \alpha$ from which, by expansion, $VR_3$ may be expressed as:

$VR_3 = K \sin (\phi_o - \alpha) \sin wt +$ higher harmonics.

It can be seen that the amplitude of the first harmonic represents the distance error between the required distance $\phi_o$ set by the voltages $VR_1$ and $VR_2$, and the true distance $\alpha$ given by the rotation of the resolver shaft from its "neutral position."

The block 2 isolates the first harmonic of the resolver response and demodulates it, to give the distance error signal which is expressed as a voltage. This error is subsequently amplified within the block 2.

The block 3 represents any positioning linkage which, on the basis of the error, acts on the mobile element to bring it to the required distance.

In this manner, the distance error is eliminated and the required positioning is obtained.

It is evident from the description that the blocks 1, R, 2, 3 carry out the positioning at the distance $\phi_o$ set by the block A. This positioning takes place in a closed loop, because of which when the positioning has been accomplished the system keeps the mobile element in the position $\alpha$ corresponding to the required position $\phi_o$.

The closed loop of the positioning linkage is obtained by way of the resolver, which operates as a distance error generator, as indicated by the dashed connection which represents the mechanical coupling between the resolver shaft and the mobile element.

It is further evident that if the block A is constructed in a suitable manner, the system is able to carry out any positioning sequence.

If the connection between block 2 and block 3 is removed, the positioning linkage (block 3) may be controlled manually.

The block 4 is used only for measuring a distance, and during automatic positioning it is deactivated.

The block 4 is activated when measuring the true distance. It acts on the block 1 to vary the generated angle $\phi_o$ (in this case it is preferably called the angle of measurement, because its value must tend towards the true distance) and thus vary the voltages $VR_1$ and $VR_2$ which feed the resolver.

While the distance error between the true distance $\alpha$ and the generated distance determined by the voltage $VR_2$ and $VR_2$ is other than zero, the block 4 continues to act on the block 1 as it is controlled by the error signal $f(e)$. It acts in such a manner that the phases of the two voltages $VR_1$ and $VR_2$ represent an angle which tends towards the true distance.

When $VR_1$ and $VR_2$ represent the angle $\alpha$, the resolver signals that the distance error is zero and thus the block 4, controlled by $f(e)$ which has been cancelled, no longer acts on the block 1.

The block 1 will then be set to the true distance $\alpha$, in the binary systems with 12 bits.

The distance is thus available in digital form to be stored and/or visualized in the block B, which diagrammatically represents the store or visualizer.

The voltages $VR_1$ and $VR_2$ described by the diagrams of FIG. 2 are generated by the block 1. It should be noted that the definition of the voltages $VR_1$ and $VR_2$ is determined by the moments of change-over from the value zero to the values $\pm 1$ and vice versa.

The operation of the various blocks of the present invention will be more evident by reference to FIGS. 3, 4, 5, 6 which represent the simplified circuit diagrams of blocks 1, R, 2 and 4 respectively.

FIG. 3 shows that the block 1 comprises various significant circuit parts, including a logic part which determines the moments of change-over of the voltages $VR_1$ and $VR_2$.

The logic which determines the moment of change-over consists of two counters $C_1$ and $C_2$, two adders $S_1$ and $S_2$ and a suitable combining network. Both counters are of 12 bits.

The 12 bits of the binary counter $C_2$ determines the angle $\phi_o$ positioned in the counter by the block A. The counter does not operate during the positioning of the mobile element as its counting system is deactivated by a suitable control signal from the block $4(E_4)$.

The first ten bits of this counter represent a number less than 1024. This number represents any angle between 0° and 90°. The resolution is evidently not continuous and there will be an error due to the quantization, but this will be less 6' of a degree. The bits $\phi_{10}$ and $\phi_{11}$ are the "heaviest" bits of the counter and define the quadrant in which the angle $\phi_o$ is located.

The binary counter $C_1$ is always in a counting state, and it counts from zero to 4096 in a time of 2.5 ms. It generates a binary ramp at a frequency of 400 Hz (period = 2.5 ms). The first 10 bits of the counter $C_1$ execute a binary ramp in a time corresponding to one quarter of a period. The last two bits $N_{10}$ and $N_{11}$ of the binary counter $C_1$ determine which quarter of a period is under examination.

The adder $S_2$ sums the first 10 bits of the counter $C_2$ and the first 10 bits of the counter $C_1$. In each quarter of a period, the bit $\Sigma_{10}$, which is the 11th bit of the result of the adder, passes to 1 when the sum exceeds the number 1024 and remains at this value until the counting of the quarter of a period under examination has terminated. In the quarter of a period under examination, the moment of change-over (from "0" to "1") of the bit $\Sigma_{10}$ corresponds to a time equal to the phase 90° − $\phi_o$.

The adder $S_1$ calculates the difference between the first ten bits of the counter $C_1$ and the first 10 bits of the counter $C_2$. The moment of change-over of the bit $\overline{\Sigma}_{10}$ (from 0 to 1) thus occurs at a time corresponding to the angle $\phi_o$ of the quarter of a period considered. The combining network has therefore the following inlets:

$N_{10}$ and $N_{11}$, which represent the considered quarter of a period in time;
$\phi_{10}$ and $\phi_{11}$, which represent the quadrant in which the required distance $\phi_o$ is located;
$\overline{\Sigma}_{10}$ represents the phase $\phi_o$ in time;
$\Sigma_{10}$ which represents the phase 90° − $\phi_o$ in time.

The combining network, which may be constructed in various ways and which is of known operation, generates eight signals, i.e.:

$S_1^-$, $R_1^-$ which represent the moments of change-over of the signal $VR_1$ in the half period in which this latter must be negative
$S_1^+$, $R_1^+$ which represent the moments of change-over of the signal $VR_1$ in the half period in which this must be positive
$S_2^-$, $R_2^-$ which represent the moments of change-over of the voltage $VR_2$ in the half period in which this must be negative
$S_2^+$, $R_2^+$ which represent the moments of change-over of the voltage $VR_2$ in the half period in which this must be positive.

These signals in pairs (in the manner in which they are described) control four bistables JK which generate four signals which, when they are in the active state, represent the positive and negative waves of the voltages $VR_1$ and $VR_2$. The signals generated by $JK_1$ and $JK_2$ are respectively:

sin⁻ (in the active state when it is at "0") and represents in its active state the negative half wave of the voltage $VR_1$, and
sin⁺ (in the active state when it is at "1") and represents in its active state the positive half wave of the voltage $VR_1$.

Likewise the signals generated by $JK_3$ and $JK_4$ are cos⁻ and cos⁺ respectively, they have the same specifications as sin⁻ and sin⁺ and pertain to the voltage $VR_2$.

These four signals control two suitable analogue circuits able to regenerate the signals. The operation of these analogue circuits is very simple, with the transistors $T_1$ and $T_2$ operating as switches while the operational amplifier $A_1$ executes the sum of the signals at the inlet.

The transistor $T_1$ is saturated, and therefore operates as a closed switch when the sin⁻ inlet is "1".

When sin⁻ is at "1," this signal saturates $T_1$ through $R_4$, and $T_1$ then behaves as a closed switch. This means that the inlet voltage to the amplifier Al, through $R_2$ and deriving from $T_2$, gives rise to a zero component at the outlet $VR_1$.

In contrast, when sin⁻ is "0," i.e. in the active state, the transistor $T_1$ is open and there is thus a voltage at the inlet of A1 through $R_2$ which gives rise to a component at the outlet $VR_1$ which is proportional to $V_o$ in the ratio $R_1$, $R_2$, and negative.

The transistor $T_2$ operates analogously to the transistor $T_1$, but the switch is closed when sin⁺ equals "0,"

giving a zero component at $VR_1$, and the switch is open when sin+ equals "1" in the active state, in which case the total component is proportional to $V_o$ and positive in the ratio of the values of $R_1$ and $R_3$.

The second analogue circuit which generates the voltage $VR_2$ operates in a manner perfectly identical with that heretofore described.

Referring to FIG. 4, the structure of the resolver comprises four electrical windings connected into a magnetic structure such that if the two stator windings $ST_1$ and $ST_2$ are fed with voltages of the type $VR_1$ and $VR_2$, a voltage of the type $VR_3$ may be obtained at the rotor winding $RT_1$.

The rotor winding $RT_1$ is obviously rigid with the other rotor winding $RT_2$, and their position with respect to the stator windings is variable in accordance with the angle $\alpha$ through which the transducer shaft and rotor are rotated relative to the static housing.

Figure 5:
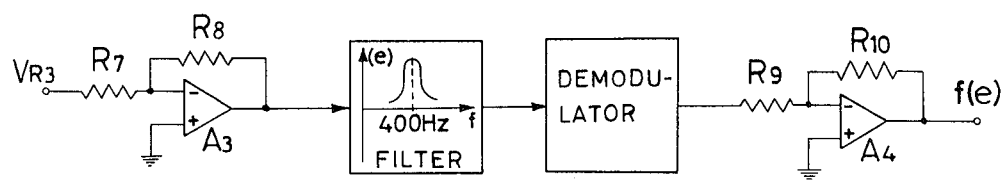
FIG. 5 is a diagrammatic functional representation of that part of the apparatus which processes the electrical response originating from the rotary electromagnetic transducer and generates the electrical error function.

In FIG. 5, which shows the operational diagram of the block 2, it can be seen that an operational amplifier A3 is present at the inlet, and is used in conjunction with $R_7$ and $R_8$ as an impedance adaptor.

It receives the output signal $VR_3$ from the resolver and feeds the subsequent block which, in the present case, is a band pass filter with a resonance frequency of 400 Hz.

The filter is necessary to eliminate the harmonics subsequent to the first in the Fourier series expansion of the resolver response $VR_3$.

The filter feeds the demodulator block which consists of a traditional diode bridge demodulator.

The output from the demodulator represents the distance error and is subsequently amplified by the amplifier A4 with an inverting connection, according to the ratio of the values of $R_{10}$ and $R_9$.

The final electrical output from the block 2 heretofore described consists of a voltage $f(e)$ which is a function of the error between the set distance $\phi_o$ and true distance $\alpha$, and is suitable for driving any power linkage, represented by the block 3, which positions the controlled mobile members.

Figure 6:
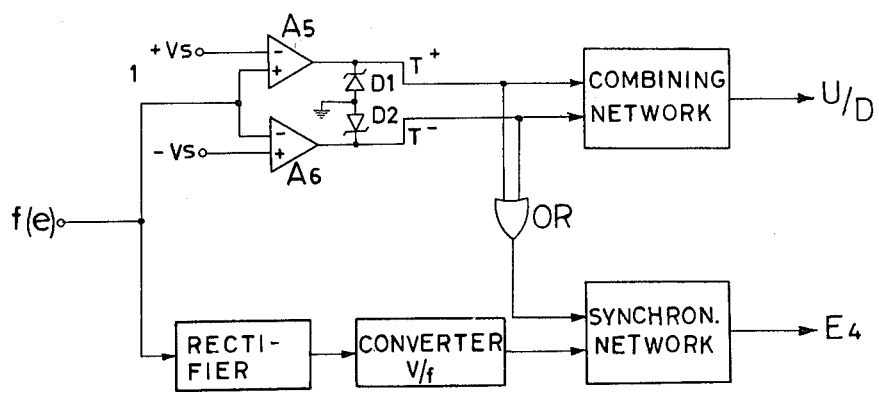
FIG. 6 is a diagrammatic functional representation of that part of the apparatus which enables the true distance measured by the rotary electromagnetic transducer to be rapidly calculated.

With reference to FIG. 6, the block 4 consisting of circuits divided into two branches is able to carry out two different functions.

The first branch consists of a comparator with two thresholds $+Vs$ and $-Vs$, with the two amplifiers A5 and A6 always operating in either positive or negative saturation.

When $f(e)$ is greater than the positive threshold $+Vs$, the output $T+$ of the amplifier A5 tends towards the value of its positive feed voltage without however reaching it, because the Zener diode $D_1$ keeps the value $T+$ at its Zener voltage, i.e., 5V.

The value 5V has been chosen to make the outlet TTL compatible.

When $f(e)$ is less than the positive threshold $+Vs$, the output of the operational amplifier A5 tends towards the value of its negative feed voltage, but it cannot reach it because the Zener diode $D_1$ goes into direct conduction, because of which $T+$ is equal to approximately OV.

There is an anogous operation at the outlet $T-$ of the amplifier A6, at the diode $D_2$, which is equal to "1" when $f(e)$ is less than the negative threshold $-Vs$ and "0" in the opposite case.

Consequently when $f(e)$ is outside the thresholds $+Vs, -Vs$, one of the two outputs $T+$ and $T-$ is at "1," while within the thresholds the outputs are both at "0."

If an OR operation is carried out on the two outputs $T+$ and $T-$, a signal is obtained which is "1" when the error $f(e)$ is outside the threshold, i.e., when the voltages $VR_1$ and $VR_2$ do not represent the true distance $\alpha$.

This signal equals "0" when the error $f(e)$ is within the thresholds, i.e, when the voltages $VR_1$ and $VR_2$ represent the true distance $\alpha$ less a negligible error due to the thresholds not being zero.

The combining network of FIG. 6 determines the signal U/D which drives the control at the counter $C_2$ of block 1 of FIG. 1 for increasing or decreasing the count, therefore varying the angle $\phi_o$ in such a manner as to make it tend towards the value of the true distance.

The second branch of the block 4 consists of a rectifier which calculates the modulus of $f(e)$, and a voltage/frequency converter.

The output from this converter of FIG. 6 is synchronized at the clock of the counters $C_1$ and $C_2$ by a synchronizing network.

These synchronized pulses form the signal $E_4$ for the counter $C_2$, i.e., they enable the counter to count.

The OR of the signals $T+$ and $T-$ also acts on the synchronizing network in such a manner that when it is "zero," i.e., when $VR_1$ and $VR_2$ represent the true distance $\alpha$, the output $E_4$ deactivates the counter $C_2$.

The use of the voltage/frequency converter instead of a clock of any type enables a rapid count to be made when $f(e)$ is very high so as to make $\phi_o$ quickly approach $\alpha$, and to make a slow count when $\phi_o$ is close to $\alpha$.

In this manner oscillations in the measurement of the distance are avoided.

When the counter $C_2$ of block 1 is deactivated it stores the through distance, which may be written into a store and/or visualised.

The block A acts in such a manner as to make the signal $E_4$ control the operation of the counter $C_2$ during the measurement of a distance by the signal $E_4$.

The block B is a diagrammatic representation of the store or a visualizer, which is activated by a suitable signal from the lagic A only after the distance has been measured.

Thus a new loop consisting of the blocks R, 2, 4, 1 is used during the measurement of a distance.

Suitable circuits not essential for the purposes of the present invention are used to generate the positive and negative voltages necessary for feeding the logic circuits and operational amplifiers.

What we claim is:

1. In a system responsive to the relative position of first and second relatively movable members of a measuring device, one of said members having a pair of windings disposed in quadrature and the other of said members likewise having a pair of windings disposed in quadrature, said members being relatively movable between a first portion in which the pairs of windings are aligned and other positions in which the pairs of windings are rotatably displaced from said first position, the combination of:

circuit means connected to one pair of said windings for applying respective voltages $VR_1$ and $VR_2$ thereto whereby voltages $VR_3$ and $VR_4$ appear at the respective windings of said other pair; and demodulating means connected to one winding of said other pair for demodulating one of said voltages $VR_3$ and $VR_4$ to recover an error voltage $f(e)$ proportional to the phase $\phi_o - \alpha$ where $\alpha$ is the relative angular position of said other pair of windings with respect to said one pair of windings and $\phi_o$ is an imaginary angle established by $VR_1$ and $VR_2$;

said circuit means comprising a first counter having an $n$ bit output, clock means connected to said first counter for causing said first counter to count its full capacity $2^n$ for each of successive time periods T where T is the period of said voltages $VR_1$ and $VR_2$, a second counter having an $n$ bit output, means for setting said second counter to contain a count corresponding to said angle $\phi_o$, summing means connected to the least significant $n-2$ bits of said first and second counters for producing the respective outputs $\Sigma_{n-2}$ and $\overline{\Sigma}_{n-2}$ which respectively are the instantaneous sum and instantaneous differences of the count represented by said $n-1$ bits of said first counter and the count represented by said $n-2$ bits of said second counter, and voltage generating means having the following inputs:
(1) the two most significant bits of said first counter,
(2) the two most significant bits of said second counter,
(3) said instantaneous sum, and
(4) said instantaneous difference for producing said voltages $VR_1$ and $VR_2$ respectively in the form of bipolar pulse pairs of period T and having the pulses thereof of time duration corresponding to $2\phi_o$ and centered on T/4 and 3T/4 and bipolar pulse pairs of period T and having the pulses thereof of time duration corresponding to $2(90° - \phi_o)$ and centered on T/4 and 3T/4.

2. In a system as defined in claim 1 including positioning means connected to said other pair of windings and having the output $f(e)$ of said demodulating means connected thereto for rotating said other pair of windings such that $\phi_o = \alpha$, and said means for setting said second counter comprises mechanism for providing a fixed count input corresponding to $\phi_o$.

3. In a system as defined in claim 1 wherein said means for setting said second counter comprises voltage-to-frequency converting means having said error voltage $f(e)$ connected thereto for changing the count of said second counter to equal $\alpha$, and display means for recording the count contained in said second counter.

4. In a system of the type including a rotary electromagnetic transducer having a stator provided with a pair of orthogonal windings and a rotor provided with a pair of orthogonal windings, said rotor being rotatable with respect to said stator to establish an angular displacement $\alpha$ therebetween which represents the position of a member, the combination of:
circuit means for generating alternating voltages $VR_1$ and $VR_2$ which are functions of an imaginary angle $\phi_o$ and are applied to the respective windings of said pair of stator windings whereby the response signals induced in each of the rotor windings contain information concerning the phase angle $\phi_o - \alpha$;
demodulating means receiving one of said response signals for producing an error signal $f(e)$ containing said phase angle information; and
means responsive to said error signal $f(e)$ for changing said imaginary angle whereby it approaches the value of $\alpha$ so that the value of said changed imaginary angle contains information concerning the position of a member to which said rotor is attached without requiring relative movement between said stator and said rotor; and
means for determining the position of said member from the value of said changed imaginary angle;
said circuit means including a first counter having an $n$-bit output and means for clocking said first counter to generate said $n$ bits once during each time period of the signals $VR_1$ and $VR_2$, a second counter, means for initially storing a count in said second counter corresponding to said imaginary angle, said second counter having an $n$-bit output and means responsive to the amplitude of said error signal $f(e)$ for clocking said second counter to contain a count converging on that value corresponding to $\alpha$, and summing means connected with the least significant $n-2$ bits of said first and second counters for producing signals representing the instantaneous sum and the instantaneous difference of the counts in said first and second counters.

5. In a system of the type including a rotary electromagnetic transducer having a stator provided with a pair of othogonal windings and a rotor provided with a pair of orthogonal windings, said rotor being rotatable with respect to said stator to establish an angular displacement $\alpha$ therebetween which represents the position of a member, the combination of:
circuit means for generating alternating voltages $VR_1$ and $VR_2$ which are functioning of an imaginary angle $\phi_o$ and are applied to the respective windings of said pair of stator windings whereby the response signals induced in each of the rotor windings contain information concerning the phase angle $\phi_o - \alpha$;
demodulating means receiving one of said response signals for producing an error signal $f(e)$ containing said phase angle information; and
positioning means responsive to said error signal $f(e)$ for rotating said rotor relative to said stator to reduce said error signal to zero;
said circuit means including a counter having an $n$-bit output and means for clocking said counter to generate said $n$ bits once during each time period of the signals $VR_1$ and $VR_2$, means having a fixed $n$-bit output representing a count corresponding to said imaginary angle, and summing means connected to the least significant $n-2$ bits of the count in said counter and said count representing said imaginary angle for producing signals representing the instantaneous sum and the instantaneous difference of such $n-2$ bits representing the count in said counter and the count corresponding to said imaginary angle.

* * * * *